United States Patent [19]

Ville et al.

[11] Patent Number: 5,085,677
[45] Date of Patent: Feb. 4, 1992

[54] OIL DEAERATOR DEVICE

[75] Inventors: Daniel Ville, Meudon la Foret; Jean-Paul Vives, Saint Gratien, both of France

[73] Assignee: Societe Anonyme Dite Hispano-Suiza, Saint-Cloud, France

[21] Appl. No.: 674,882

[22] Filed: Mar. 26, 1991

[30] Foreign Application Priority Data

Mar. 28, 1990 [FR] France ............... 90 03936

[51] Int. Cl.⁵ .................................. B01D 45/12
[52] U.S. Cl. ..................................... 55/205
[58] Field of Search ............. 55/177, 191, 204, 205, 55/184

[56] References Cited

U.S. PATENT DOCUMENTS

| | | | |
|---|---|---|---|
| 1,915,436 | 6/1933 | Moore et al. | 55/184 |
| 2,401,079 | 5/1946 | Jones et al. | 55/205 |
| 2,578,568 | 12/1951 | Mayer et al. | 55/205 |
| 2,983,331 | 5/1961 | Helsley, Jr. | 55/204 |

FOREIGN PATENT DOCUMENTS 1548071 7/1979 United Kingdom .

*Primary Examiner*—Bernard Nozick
*Attorney, Agent, or Firm*—Oblon, Spivak, McClelland, Maier & Neustadt

[57] ABSTRACT

An oil deaerator device for an oil tank comprises a cylindrical chamber having a tangential inlet duct in its lower portion for the introduciton of pressurized oil to be deaerated, tangential outlet ducts for the deaerated oil in the upper portion of the chamber, and an axial outlet duct, also in the uper portion of the chamber, for the discharge of air from the chamber.

The device, which operates on the vortex principle, is fitted within the tank in the upper portion thereof above the normal level of oil in the tank.

3 Claims, 1 Drawing Sheet

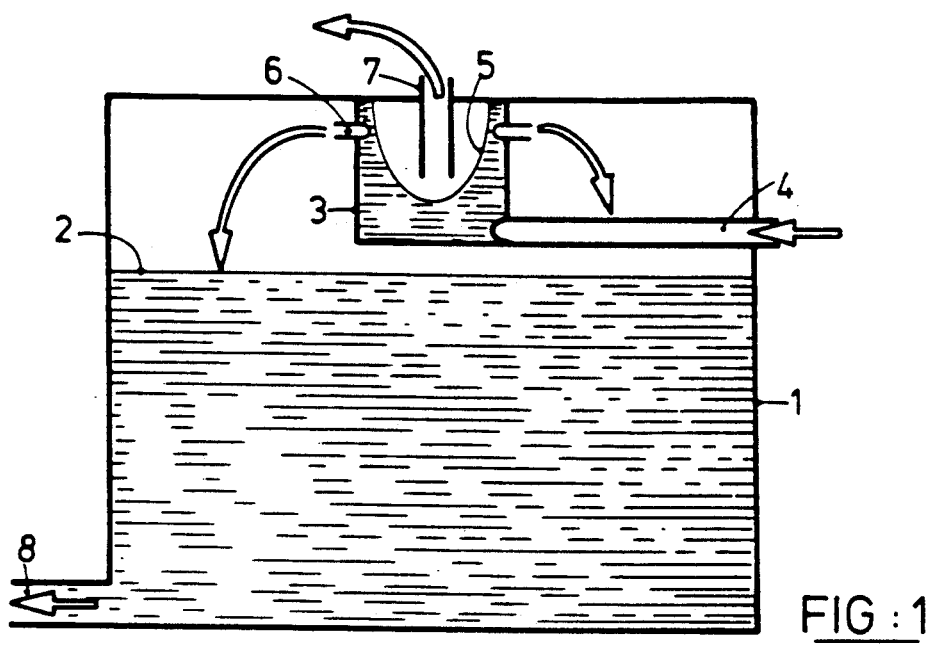
FIG:1
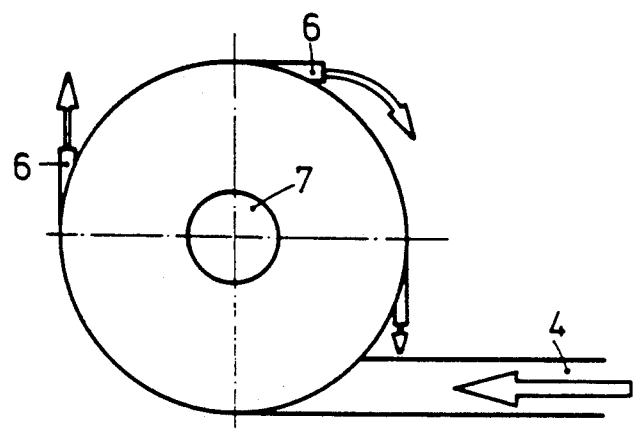
FIG:2
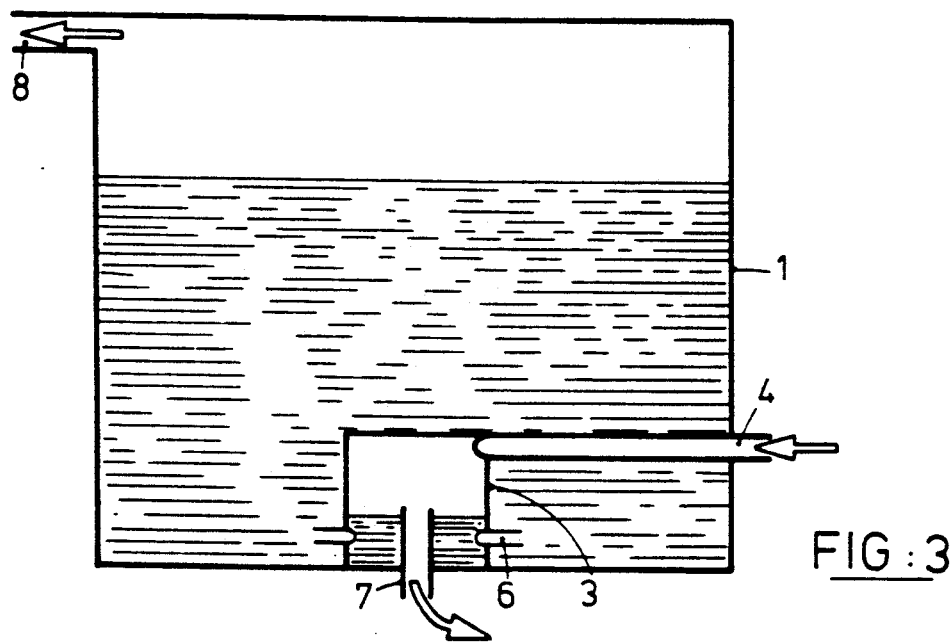
FIG:3

OIL DEAERATOR DEVICE

BACKGROUND OF THE INVENTION

1. FIELD OF THE INVENTION

The present invention relates to an oil deaerator, that is to say a device for removing air bubbles carried by the oil in a lubrication circuit.

The problem of oil deaeration is encountered in particular in the operation of machines, especially turbo-shaft aero-engines. In the bearings the lubricating oil becomes charged with air bubbles, and the recovery pumps deliver back to the oil reservoir or tank an air/oil mixture in a ratio which may reach about 4/1. It is obvious that in these conditions the oil available in the tank loses a good deal of its lubricating properties, and it is for this reason that oil return circuits are generally fitted with oil and air separator devices.

2. SUMMARY OF THE PRIOR ART

Separating devices are known in which the incoming oil and air mixture is centrifuged by rotating parts, e.g. blades, against an annular wall where the oil is recovered, whereas the air is discharged at the centre. In the case of aeronautical installations, these relatively complicated devices must be driven, either from the power take-off provided for driving accessories, or directly by the main drive shaft of the engine. This constitutes a considerable limitation.

Devices are also known for effecting the separation of fluids having different specific gravities, in which the flow is diverted in an elbow duct and partly introduced into a vortex or swirl chamber which is tangential to the main flow and in immediate contact therewith in the region of the inner bend of the duct, this creating a field of centrifugal forces in the vortex chamber, outside of which the component with the lighter specific gravity is sucked by a tube projecting coaxially into the chamber. Such devices may perform satisfactorily in ground-based industrial plants, but this is not the case in aeronautical applications, and particularly in aircraft which are capable of flying upside down.

SUMMARY OF THE INVENTION

It is an object of the present invention to provide an oil deaerator device of the vortex type which avoids the drawbacks of previous separators, and to this end the invention provides an oil deaerator device for an oil tank wherein said device comprises a cylindrical chamber disposed within said tank with its axis substantially vertical, an inlet duct opening tangentially into the lower portion of said chamber for introducing pressurized oil laden with air bubbles into said chamber, a plurality of outlet ducts leading tangentially from the upper portion of said chamber for the discharge of deaerated oil from the chamber, and an axial outlet duct situated in the upper portion of said chamber for the discharge of air from said chamber, said device being disposed in the upper part of said tank above the normal level of oil in said tank.

Preferably said axial air outlet duct projects for about half the height of said chamber into the central portion of said chamber.

Preferably said tangential oil outlet ducts are evenly distributed around the periphery of said chamber, and the total cross-sectional area of said oil outlet ducts is at least equal to the cross-sectional area of said inlet duct.

One embodiment of the invention will now be described, by way of example, with reference to the accompanying drawings.

BRIEF DESCRIPTION OF THE DRAWINGS

FIG. 1 is a diagrammatic view of an oil tank of an aircraft fitted with one embodiment of the device in accordance with the invention, showing the operation of the device under normal flight conditions.

FIG. 2 is a top plan view, to a larger scale, of the oil deaerator device shown in FIG. 1.

FIG. 3 is a view similar to that of FIG. 1, but showing the positions of the tank and deaerator device under inverted flight conditions.

DESCRIPTION OF THE PREFERRED EMBODIMENT

As shown in FIG. 1 the oil deaerator device in accordance with the invention is placed inside an oil tank 1 on its upper wall, i.e. the wall which is uppermost when the aircraft is flying normally, and is thus positioned above the normal oil level 2 in the tank. The deaerator device comprises a cylindrical chamber 3 which is arranged with its axis upright and which has a tangential inlet duct 4 at its lower end for receiving the air-bubble laden oil delivered under pressure by the recovery pumps of the lubrication circuit. The tangential flow into the vortex chamber causes, through centrifugal action, a peripheral distribution of the oil with an inner separation surface 5 of parabolic form towards the centre of which the air bubbles are driven. Oil discharge is effected through tangential outlet ducts 6 located in the upper part of the chamber 3, these ducts 6 enabling the oil ascending along the walls of chamber 3 to leave the chamber and fall back into the tank 1. An axial duct 7 projects through the top of the tank 1 and the chamber 3 as far as the central region of the chamber to provide for the discharge of air and prevent the tank from becoming over pressurized.

At the base of the tank 1 there is an oil feed duct 8 connected to the lubrication pumps of the circuit.

FIG. 2 shows a top plan view of the deaerator device, illustrating in particular the arrangement of the tangential oil outlet ducts 6. There should be at least two of these ducts 6, and in the example shown there are three.

FIG. 3 illustrates the operation of the tank and deaerator device during inverted flight. In this condition, the tank 1 is inverted and the lubrication circuit is temporarily swept through by air. This air is returned to the deaerator device at 4 by the recovery pumps, and is discharged through the duct 7 without any flow of oil, since the oil level in the chamber 3 will be lower than the mouth of the said outlet duct 7.

The deaerator device in accordance with the invention as described above is a simple device which requires no maintenance, and which achieves, on the one hand, deaeration of the oil returning to the tank for resupply to the lubrication circuit, and, on the other hand, ensures the discharge of air from the tank in inverted flight in order to avoid pressurizing it to bursting point.

We claim:

1. In an oil tank, an oil deaerator device comprising a cylindrical chamber disposed with its axis substantially vertical, an inlet duct opening tangentially into the lower portion of said chamber for introducing pressurized oil laden with air bubbles into said chamber, a plurality of outlet ducts leading tangentially from the upper portion of said chamber for the discharge of deaerated oil from the chamber to the tank, and an axial outlet duct situated in the upper portion of said chamber for the discharge of air from said chamber and the tank, said device being disposed inside said tank in the upper part thereof above the normal level of oil in said tank.

2. An oil deaerator device according to claim 1, wherein said axial air outlet duct projects for about half the height of said chamber into the central portion of the said chamber.

3. An oil deaerator device according to claim 1, wherein said tangential oil outlet ducts are evenly distributed around the periphery of said chamber, and wherein the total cross-sectional area of said oil outlet ducts is at least equal to the cross-sectional area of said inlet duct.

* * * * *